United States Patent [19]

Brosch

[11] Patent Number: 4,548,118

[45] Date of Patent: Oct. 22, 1985

[54] ROTARY CUTTER

[75] Inventor: Fred C. Brosch, Cleveland, Ohio

[73] Assignee: Brosch Products, Inc., Cleveland, Ohio

[21] Appl. No.: 547,058

[22] Filed: Oct. 31, 1983

[51] Int. Cl.[4] .............................................. B26D 3/00
[52] U.S. Cl. ...................................... 83/522; 83/555; 83/564; 83/591; 30/310
[58] Field of Search .......................... 83/564, 591–596, 83/522, 490, 555; 30/310; 408/87, 88, 89, 100

[56] References Cited

U.S. PATENT DOCUMENTS

| | | | |
|---|---|---|---|
| 2,066,381 | 1/1937 | Albertson | 83/490 X |
| 3,286,573 | 11/1966 | Esch | 30/310 X |
| 3,994,194 | 11/1976 | Moceri | 30/310 X |
| 4,060,893 | 12/1977 | Matsuura | 30/310 |
| 4,173,913 | 11/1979 | Nicholson | 83/555 |

*Primary Examiner*—James M. Meister
*Attorney, Agent, or Firm*—Yount & Tarolli

[57] ABSTRACT

A rotary cutter for cutting holes of various sizes in sheet material such as self-adhesive pads. The cutter includes a base to which a cover is pivotally mounted for movement between a lowered closed position where it overlies the base and a raised open position. The cover has upstanding side walls defining a cavity between the roof of the cover and the upper surface of the base. A blade carried by a blade arm rotates within the cavity for cutting holes in sheet material carried on the base. The blade arm is adjustably secured to one end of a shaft extending into the cavity which is journaled in a bearing sleeve in the roof of the cover permitting rotary as well as axial movement permitting the blade to be pressed downwardly to the sheet material during rotary cutting operations. A crank arm is mounted to the other end of the rotor shaft for imparting rotary motion to the blade arm.

17 Claims, 5 Drawing Figures

ROTARY CUTTER

BACKGROUND OF THE INVENTION

This invention relates to the art of rotary cutters, and, more particularly, to a cutter for cutting oval or circular holes in sheet materials such as adhesive backed pads sometimes referred to as stomahesive pads which are frequently used by those who have had Ilyostomy or Collostomy operations for purposes of attaching a bag or the like to the abdomen.

Whereas the invention is described herein with respect to cutting holes in such stomahesive pads or the like, it is to be appreciated that the invention has broader applications and may be used in various applications requiring the cutting of oval shaped or circular holes in sheet material.

Patients who have had Ilyostomy or collostomy operations utilize such stomahesive pads for purposes of attaching a bag or the like to the abdomen. Depending on the nature of the operation, the patient has drainage holes of varying sizes and shapes. Consequently, each patient needs to provide a similarly shaped and dimensioned aperature in a stomahesive pad. It has been common in the art for such patients to use scissors and the like for performing the necessary cutting operations.

A rotary cutter known in the art for use by such patients takes the form of that disclosed in the U.S. Pat. No. 4,173,913, to D. S. Nicholson. Nicholson teaches a rotary cutter for cutting holes in sheet material, including self-adhesive pads of the type used by patients who have had Ilyostomy and collostomy operations, wherein the sheet material is mounted on a base and a rotary cutter is mounted on a frame and is pivoted in hinge like fashion to the base and wherein the cutter is adjustable so that holes of different sizes may be made. However, this cutter construction does not permit the operator to exert downward pressure on the cutting blade as it is being rotated to assist in cutting operations. Additionally, whereas Nicholson does provide a scale for use in adjusting the size of a cut to be made, only one scale is provided leaving the operator to guess on the adjustment for different sizes. The manner in which the blade assembly is mounted to the frame or cover is cumbersome, particularly with respect to disassembly for cleaning and the like.

It is a primary object of the present invention to provide an improved rotary cutter adapted for use in cutting holes or the like in sheet material and which overcomes the foregoing and other problems encountered with prior art such as that noted in Nicholson, supra.

Another object of the present invention is to provide such a rotary cutter having an axially movable shaft permitting downward pressure to be exerted on the cutting blade during cutting operations and yet permitting the blade to be raised above and free of the material being cut.

A further object of the present invention is to provide such a rotary cutter having an adjustable blade assembly held in position to the shaft by means of a thumb screw which extends through the shaft center whereby no tools are required for adjusting the blade position and, hence, hole size.

It is a still further object of the present invention to provide a plurality of measurement scales in relief so that the operator, whether blind or not, may conveniently adjust the blade assembly for different sized cuts.

In order to achieve the foregoing and other objects of the present invention, the rotary cutter includes a structure incorporating a base having a flat upper surface for supporting the sheet material to be cut. A cover is pivotally mounted to the base for movement between a lowered closed position where overlies the upper surface of the base and a raised open position. The cutter mechanism is mounted to the cover for performing cutting operations when the cover is in its closed position. The cover incorporates a bearing structure which serves to rotatably mount a shaft having one end extending into a cavity between the cover and the base and the opposite end of the shaft located externally of the cover. A blade arm is carried by the shaft within the cavity and extends radially outwardly therefrom. A blade is mounted to the blade arm and extends downwardly toward the base for purposes of cutting holes in sheet material located on the base when the shaft is rotated. A rotary driving means, such as a crank arm, extends from the opposite end of the shaft for imparting rotary movement to the shaft for performing the cutting operations. The shaft is rotatably mounted in the cover in such a manner to permit rotary movement of the shaft about its axis as well as axial movement. Thus, as the shaft is being turned, an axial force may be imparted by the operator causing the cutting blade to trace an arcuate downward path while cutting the sheet material. This also permits the blade to be raised above and free of the sheet material during a noncutting operation.

BRIEF DESCRIPTION OF THE DRAWINGS

The foregoing and other objects and advantages of the present invention will become more apparent from a consideration of the following description as taken in conjunction with the accompanying drawings, wherein.

DETAILED DESCRIPTION OF PREFERRED EMBODIMENT

Figure 1:
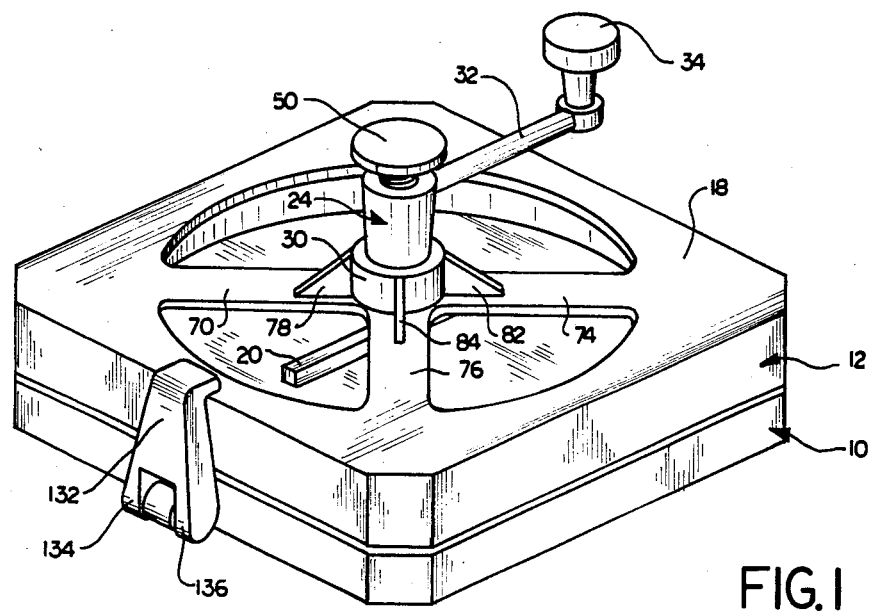
FIG. 1 is a perspective view of the rotary cutter in accordance with the invention.

Reference is now made to the drawings which illustrate a preferred embodiment of the rotary cutter. The rotary cutter to be described herein is constructed from plastic molded parts, except for the cutting blade itself, and these parts either snap together or are threaded together so that the parts may be disassembled and reassembled, as for cleaning purposes, without the use of any special tools. The cutter is comprised of a base 10 and a cover 12 pivotally mounted, as with hinge 14, to the base for pivotal movement between a closed or lowered position, as shown in the drawings, and a raised or open position. The cover 12 has upstanding side walls defining a work cavity 16 between the upper flat surface of base 10 and the roof 18 of the cover. A blade arm 20, to which is mounted a cutting blade 22, is located in this cavity and is mounted at one end of a rotor shaft 24. The rotor shaft extends upwardly through roof 18 where it is journaled in a sleeve bearing 30 located in roof 18. The upper end of the shaft 24 has a crank arm 32 extending therefrom radially outward. A crank handle 34 is secured to the free end of arm 32. The shaft 24 is mounted for rotary movement about its axis of rotation by the sleeve bearing 30 which provides support therefor and which permits axial movement of shaft 24 so that the operator may press downward as he performs the cutting operation.

Figure 5:
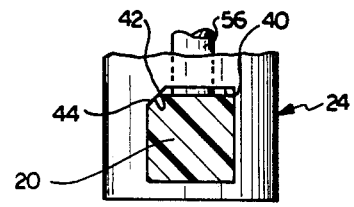
FIG. 5 is a sectional view taken along line 5—5 in FIG. 4, looking in the direction of the arrows.

The blade arm 20 is mounted to the rotor shaft 24 at its lower end within cavity 16. Thus, the lower end of the rotary shaft is provided with a rectangular shaped channel 40 which serves to slidably receive blade arm 20 so that the blade arm may be adjusted in a radial direction for different sized cuts. As best seen in FIG. 5, channel 40 is bevelled at one corner 42 which cooperates with a similar bevel 44 on arm 20. This bevelling of channel 40 and arm 20 ensures that arm 20 can only be inserted into the channel such that the blade 22 is always directed downward and is located underneath and to the same side as crank arm 32. This ensures that the desired pressure may be applied axially downward by way of the rotor shaft 24 during cutting operations.

Figure 3:
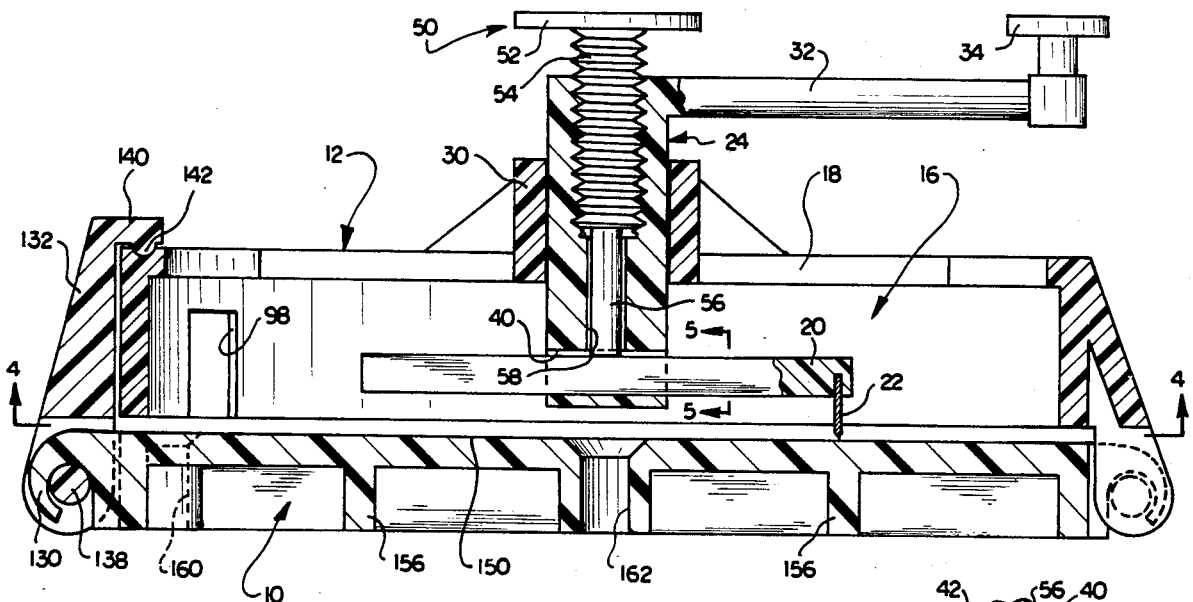
FIG. 3 is a cross sectional view taken along the line 3—3 in FIG. 2 looking in the direction of the arrows, but enlarged.

The blade arm 20 is held in place at its desired cutting radius by means of a thumb screw 50 which extends downwardly through the center of the rotor shaft 24. As best seen in FIG. 3 thumb screw 50 includes a head portion 52 which may be manually engaged while threading and unthreading the thumb screw, a threaded portion 54 and extended shank portion 56. The shank portion 56 extends through a passageway 58 in shaft 24 so as to make abutting frictional engagement with the blade arm 20 to hold the blade in place at its desired radial adjustment.

Figure 4:
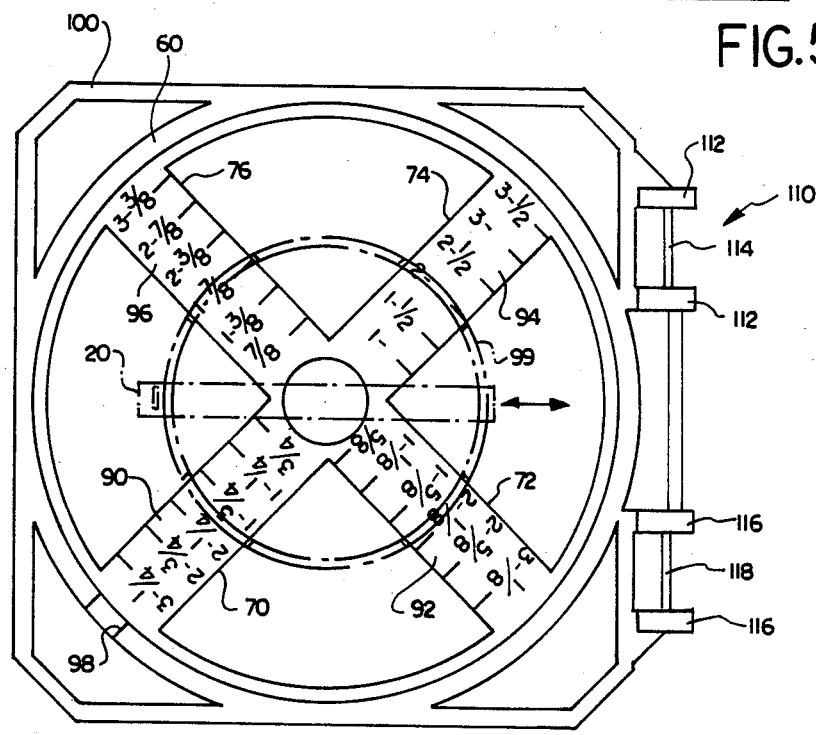
FIG. 4 is a view taken along line 4—4 in FIG. 3 looking in the direction of the arrows and showing the underneath of the cover, but of a size corresponding with that of FIG. 2.

The work cavity 16 within which blade arm 20 rotates is defined by a cylindrical wall 60 which extends downwardly from the underside of roof 18, as is best illustrated in FIG. 4. The lower edge of cylindrical wall 60 serves to hold sheet material such as stomahesive pads in place on the upper surface of base 10 during cutting operations. The diameter of the cylindrical wall is on the order of four inches and such a stomahesive pad is typically square in shape and has dimensions on the order of four inches by four inches. Obviously, these dimensions may be changed for different applications.

Figure 2:
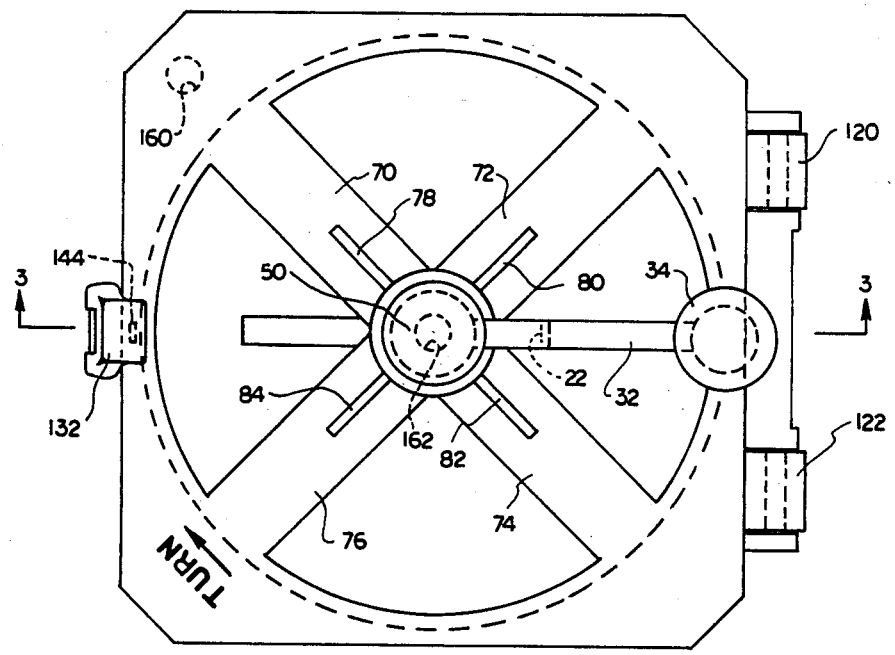
FIG. 2 is a plan view of the rotary cutter showing the cover crank arm assembly.

As best shown in FIGS. 1 and 2, the roof 18 of cover 12 has four pie-shaped openings leaving beams 70, 72, 74 and 76 which extend inwardly toward and merge with the bearing sleeve 30. Rib formations 78, 80, 82 and 84 extend between the outer surface of bearing sleeve 30 and beams 70, 72, 74 and 76, respectively, and provide structural support. The underside of these beams, as best shown in FIG. 4, provides four measuring scales 90, 92, 94 and 96 located respectively on the undersurfaces of beams 70, 72, 74 and 76. These four different scales are provided in relief so that accurate measurements can be made by a blind person, merely by aligning the blade end of the blade arm 32 with scale markings before tightening the thumb screw 50 to hold the blade arm at the desired cutting radius.

As best seen in FIG. 4, the cylindrical shaped wall 60 is provided with a slot 98 opening downwardly toward base 10. This slot is of sufficient size to accommodate blade arm 20 so that during assembly or disassembly of the blade arm with respect to the rotor shaft 24, the blade arm may be moved radially outward into the slot 98 so as to be free of the rotor shaft. This then permits the blade arm to be of sufficient length that it may rotate within the cavity 16 and perform the cuts which are of a diameter approaching that of the diameter of the cylindrical wall 60, such as, just under four inches in diameter.

Structurally, as best seen in FIGS. 1, 2 and 4, the cylindrical wall 60 is surrounded by an essentially square shaped wall 100 having canted corners and which corresponds in configuration with the exterior walls of the base 10. The pie-shaped openings between beams 70, 72, 74 and 76 in roof 18 permit the operator to observe cutting operations without opening the cutter. Additionally, such openings facilitate the removal of cut away material after a cutting operation is completed. The operator may just insert his fingers into the opening to eject material from the cutting blade.

Along one edge of cover 12, there is provided a hinge structure 110. This includes a first pair of outwardly extending flanges 112 which are connected by mounting pin 114 and a second pair of flanges 116 interconnected by a mounting pin 118. Extending outwardly and then curving downwardly from the base 10 is provided a pair eyelets 120 and 122 which snap fit over pins 114 and 118 as is best seen in FIGS. 2 and 3 so as to complete the hinge structure. The snap fit is sufficient to keep the hinge together while at the same time permitting pivotal movement of the cover relative to the base.

Another eyelet 130 extends from the opposite edge of base 10 with its opening facing downwardly as is best seen in FIG. 3. This serves to receive a clasp 132 having downwardly extending flanges 134 and 136 which are interconnected by a pin 138 which is received in a snap fit engagement with the eyelet 130 to permit pivotal movement of the clasp 132. The clasp is provided with an overhanging portion 140 having a downwardly extending knob 142 which may be received in a recess 144, as best seen in FIGS. 2 and 3 to hold the cover place in its closed position during cutting operations.

The base 10 has a flat upper surface 150 configured in the shape that is indicated by the outline as viewed in FIGS. 1 and 2. This flat upper surface serves as a platen on which sheet material to be cut is placed and against which the cutting plate is pressed against during cutting operations. The underside of the face 10 is structurally reinforced by a pattern of ribs 156 to provide strength and rigidity.

A sleeve adapter 99 shown in dotted lines in FIG. 4 is optional and may be snapped onto beams 70, 72, 74, 76 to provide a smaller cavity than that of cavity 16 such as for cutting holes in sheet material of small size, such as those dimensioned two inches by two inches. The adapter then takes the place of the cylindrical sleeve 60 for purposes of holding down such sheet material during the cutting operations. Two holes 160 and 162 are provided in base 10 to accommodate wood screws or the like for securely fastening the base to a table or the like to permit handicapped persons or the like to more easily operate the cutter. Alternatively, the base may be clamped to such a table as with a C clamp or the like.

From the foregoing, it is seen that the rotary cutter herein serves many advantages over such prior art rotary cutters as that disclosed in the U.S. Pat. No. 4,173,913, to Nicholson. These distinguishing features include the provision of an axially movable rotor shaft 24 which is rotatably supported in the sleeve bearing 30 to permit rotary movement for cutting operation as well as for permitting axial movement so that the operator may press downwardly during cutting operations. Additionally the operator may lift the shaft vertically upward to thereby lift the blade so as to be raised above and be free of the sheet material being cut. It is to be also noted that the blade arm 20 is secured to the shaft 24 by a thumb screw 50 that extends downwardly through the shaft thereby requiring no tools for making adjustment to hole size. The four scales 90, 92, 94, 96 provide a multitude of scales from which the operator may choose in adjusting the blade arm. The blade arm is provided with bevelling which cooperates with the bevelling in the channel 40 in the shaft to prevent the blade arm from being installed incorrectly. This ensures that the proper assembly requires the blade be located beneath the crank during cutting operations. Shorter blade arms may be installed on the shaft in place of the blade arm 20, particularly when used in conjunction with the adapter sleeve for making smaller cuts. Additional, the cutter provides openings in the roof 18 permitting the operator to visually inspect the material during cutting operations. This material can be freely placed within the cutter allowing multiple cuts to be made on a single piece of material. Thus, multiple cuts may be made to obtain oval shapes, cuts off center, donut-like cuts and others by displacing the material after each cut. The snap-on adapter 99 permits holes to be cut in smaller size sheet material, such as a 2×2 inch pad. The mounting holes in the base additionally provide means for securing the base to a table or the like for ease in operation by handicapped people. Lastly, it is to be noted that the rotary cutter, being entirely of plastic molded parts with the exception of the cutting blade itself, is easily disassembled and reassembled for cleaning purposes.

Whereas the invention has been described in conjunction with a preferred embodiment, it is to be appreciated that various modifications and arrangements may be made without departing from the spirit and scope of the invention as defined by the appended claims.

What is claimed is:

1. A rotary cutter for cutting apertures in sheet material, comprising:
    a base having a flat upper surface for supporting sheet material to be cut;
    a cover pivotally mounted to said base for movement between a lowered closed position where it overlies said upper surface of said base and a raised open position;
    rotary cutter means mounted on said cover and including a rotor shaft, a blade arm carried by said shaft extending radially outward therefrom, a cutting blade mounted on said arm for cutting holes in said sheet material when said cover is in is closed position and said shaft is rotated, and drive means for imparting rotational movement to said shaft, said cover having means for rotatably supporting said shaft intermediate its ends in such a manner as to permit rotary movement of the shaft about its axis of rotation as well as axial movement so that as the shaft is rotated an axial force may be imparted thereto to press said cutting blade downwardly against said sheet material during cutting operations and for permitting said blade to be removed from and be free of said sheet material; said cover has raised side walls extending away from said base and has a roof interconnecting said side walls so as to define a cavity between said cover and said base for receiving said sheet material therein, said blade arm is adjustably mounted to said shaft within said cavity such that the cutting radius may be adjusted, said roof of said cover has a plurality of measurement scales located on its interior surface for use in adjusting the radial positioning of said blade relative to said shaft making different sized cuts in said sheet material, said roof has openings defined therein and each of said scales extends radially outward from said shaft intermediate a pair of said openings whereby said openings permit observation of the cutting operation by the operator.

2. A rotary cutter as set forth in claim 1 wherein each of said openings is pie-shaped defining a radial extending beam between adjacent openings and each of said scales is located on the interior surface of one of said beams.

3. A rotary cutter as set forth in claim 2 wherein there are four sets of openings defining four radially extending beams.

4. A rotary cutter for cutting apertures in sheet material, comprising:
    a base having a flat upper surface for supporting sheet material to be cut;
    a cover pivotally mounted to said base for movement between a lowered closed position where it overlies said upper surface of said base and a raised open position;
    rotary cutter means mounted on said cover and including a rotor shaft, a blade arm carried by said shaft extending radially outward therefrom, a cutting blade mounted on said arm for cutting holes in said sheet material when said cover is in its closed position and said shaft is rotated, and drive means for imparting rotational movement to said shaft, said cover having means for rotatably supporting said shaft intermediate its ends in such a manner as to permit rotary movement of the shaft about its axis of rotation as well as axial movement so that as the shaft is rotated an axial force may be imparted thereto to press said cutting blade downwardly against said sheet material during cutting operations and for permitting said blade to be removed from and be free of said sheet material;
    said cover has raised side walls extending away from said base and has a roof interconnecting said side walls so as to define a cavity between said cover and said base for receiving said sheet material therein;
    said blade arm is adjustably mounted to said shaft within said cavity such that the cutting radius may be adjusted;
    said shaft has a passageway extending radially therethrough adjacent one end thereof within said cavity and said blade arm is slidably received through said passageway so that the blade arm extends radially outward from said shaft;
    said passageway is essentially rectangular in cross section and has a bevelled corner and said blade arm is also rectangular in cross section and has a bevelled corner cooperating with that of said passageway so that the blade arm can only be inserted into the passageway with the bevelled corners facing each other whereby the blade arm can only be mounted to the shaft in a particular configuration.

5. A rotary cutter as set forth in claim 4 including means for releasably securing said blade arm in place in said passageway in said shaft.

6. A rotary cutter as set forth in claim 5 wherein said securing means includes an adjustable thumb screw extending downwardly through said shaft from the opposite end thereof, said screw having an extended portion for engaging said arm to secure said arm in place at a desired radial adjustment.

7. A rotary cutter as set forth in claim 4 wherein said drive means includes a crank arm extending from said opposite end of the shaft in a direction radially outward therefrom and said particular configuration of said blade arm when the cutting blade is secured thereto extends downwardly toward the sheet material on said base and with the blade arm in radial alignment with that of the crank arm with said blade carried by said arm immediately underneath said crank arm.

8. A rotary cutter as set forth in claim 4 wherein said roof of said cover has a plurality of measurement scales located on its interior surface for use in adjusting the radial positioning of said blade relative to said shaft making different sized cuts in said sheet material.

9. A rotary cutter as set forth in claim 8 wherein each of said scales is provided in relief so that radial adjustment may be accomplished as by a blind person.

10. A rotary cutter as set forth in claim 8 wherein said roof has openings defined therein and each of said scales extends radially outward from said shaft intermediate a pair of said openings whereby said openings permit observation of the cutting operation by the operator.

11. A rotary cutter as set forth in claim 10 wherein each of said openings is pie-shaped defining a radial extending beam between adjacent openings and each of said scales is located on the interior surface of one of said beams.

12. A rotary cutter as set forth in claim 11 wherein there are four sets of openings defining four radially extending beams.

13. A rotary cutter as set forth in claim 8 including manually operable fastening means to interconnect said base with said cover for securing said cover in its closed position during cutting operations.

14. A rotary cutter as set forth in claim 13 including sheet material hold down means extending downwardly from said roof within said cavity so as to bear against said sheet material to hold it in place against the upper surface of the base member during cutting operations.

15. A rotary cutter as set forth in claim 14 wherein said hold down means includes a cylindrical wall coaxial with said shaft and having a diameter sufficiently large with respect to the length of said blade arm to permit rotation of said blade arm within said cavity at its greatest adjustable radial length.

16. A rotary cutter as set forth in claim 15 wherein said cylindrical wall has an axially extending slot therein of sufficient size to receive one end of said blade arm to facilitate assembly and disassembly of said blade arm relative to said rotor shaft.

17. A rotary cutter as set forth in claim 15 including an adapter sleeve adapted to be mounted on said cover coaxially about the rotor shaft in said cavity and having a diameter substantially less than said hold down wall for use in holding down smaller sized sheet material against said base during cutting operations.

* * * * *